(12) United States Patent
Turban et al.

(10) Patent No.: US 7,504,935 B2
(45) Date of Patent: Mar. 17, 2009

(54) TRANSPONDER

(75) Inventors: Peter Turban, Maxhütte-Haidhof (DE); Herbert Zimmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 334 days.

(21) Appl. No.: 11/568,105

(22) PCT Filed: Apr. 18, 2005

(86) PCT No.: PCT/EP2005/051689

§ 371 (c)(1),
(2), (4) Date: Oct. 19, 2006

(87) PCT Pub. No.: WO2005/101303

PCT Pub. Date: Oct. 27, 2005

(65) Prior Publication Data

US 2008/0012700 A1 Jan. 17, 2008

(30) Foreign Application Priority Data

Apr. 19, 2004 (DE) ........................ 10 2004 018 829

(51) Int. Cl.
*G08B 26/00* (2006.01)

(52) U.S. Cl. ................. 340/505; 340/10.1; 340/825.57; 331/167; 331/117 R; 331/117 FE

(58) Field of Classification Search ................. 340/505, 340/572.1–572.9, 10.1, 10.3, 10.41, 10.42, 340/825.57, 825.58, 825.6, 825.63, 825.7, 340/825.71; 331/167, 117 R, 117 FE
See application file for complete search history.

(56) References Cited

U.S. PATENT DOCUMENTS

| 5,027,106 A * | 6/1991 | Lizzi et al. ............... 340/572.3 |
| 5,227,740 A | 7/1993 | Steinhagen et al. ......... 331/166 |
| 5,266,926 A * | 11/1993 | Beigel ...................... 340/572.1 |
| 5,621,396 A | 4/1997 | Flaxl .......................... 340/10.4 |
| 6,624,743 B1 * | 9/2003 | Ikefuji et al. ............... 340/10.4 |
| 6,806,783 B2 * | 10/2004 | Baumann et al. ............. 331/74 |
| 2007/0194937 A1 * | 8/2007 | Berhorst et al. .......... 340/572.8 |

FOREIGN PATENT DOCUMENTS

EP 0600374 A1 6/1994

OTHER PUBLICATIONS

International Search Report and Written Opinion for International Application No. PCT/EP2005/051689 (13 pages). Sep. 17, 2005.

* cited by examiner

*Primary Examiner*—Daniel Wu
*Assistant Examiner*—Edny Labbees
(74) *Attorney, Agent, or Firm*—Baker Botts L.L.P.

(57) ABSTRACT

A transponder has a transponder tuned circuit, an energy store or energy supply and a starter device. The transponder tuned circuit has a tuned circuit capacitor and a tuned circuit coil with an inductive coupling to a base station for inductive energy and/or data transmission. On transmission the energy store provides a discharge current Ice. The starter device is arranged between the transponder tuned circuit and the energy store such as to generate an adjustable reference voltage Uref, which, on transmission, controls the transmission voltage Us-TSK such that an envelope curve H for the transmission voltage Us-TSK is constant over a transmission duration ts, giving a constant discharge current Ice from the energy store to supply the transponder tuned circuit and a discharge voltage Uce dependent on the reference voltage Uref for the energy store falls linearly to the reference voltage Uref at a transmission end tE.

17 Claims, 4 Drawing Sheets

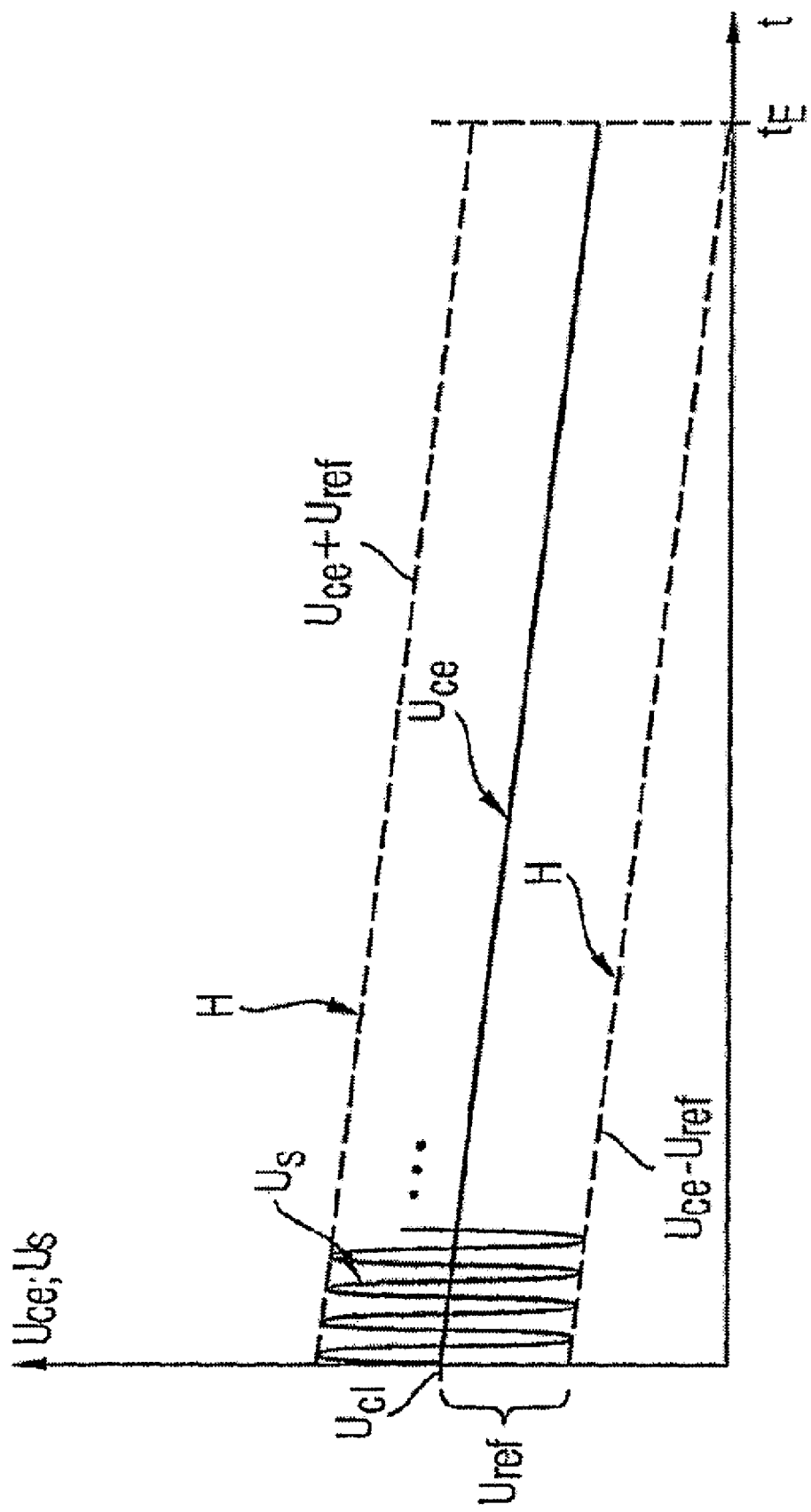

TRANSPONDER

CROSS-REFERENCE TO RELATED APPLICATIONS

This application is a U.S. national stage application of International Application No. PCT/EP2005/051689 filed Apr. 18, 2005, which designates the United States of America, and claims priority to German application number DE 10 2004 018 829.7 filed Apr. 19, 2004, the contents of which are hereby incorporated by reference in their entirety.

TECHNICAL FIELD

The present invention relates to a transponder consisting of an oscillating circuit capacitor and an oscillating circuit coil which has an inductive coupling to a base station for inductive transmission of energy and/or data.

BACKGROUND

Such a transponder for inductive transmission of energy signals and/or data signals is described in U.S. Pat. No. 5,491,483, for example. Provision is made therein for a base station that generates a magnetic alternating field via which a transponder oscillating circuit of the transponder is excited. The excited transponder oscillating circuit supplies a device for charging an energy store of the transponder, e.g. a capacitor. For the subsequent transmission of energy or data from the transponder to the base station, the transponder oscillating circuit is excited to resonate on its specific internal frequency by means of a starter device. The energy which is required for covering in particular the attenuation losses of the transponder oscillating circuit is extracted from the energy store of the transponder.

In existing systems, the energy extraction is also controlled from the energy store in such a way that the signal or voltage amplitude of the transponder oscillating circuit when sending is significantly smaller at the end of the protocol than at the beginning: In the case of single-stage transponder systems, this is a minor problem due to the close coupling, since the signal amplitude is generally very high. In the case of two-stage systems, however, this frequently results in undesirably small signal/noise ratios towards the end of the protocol or transmission due to the low signal amplitudes. The smaller the signal/noise ratio during the send operation from the transponder, the greater the probability of error when detecting the sent signals at the receiver. This is described below with reference to FIGS. 1 and 2.

FIG. 1 shows a schematic block diagram of a generally disclosed transponder (T) 1. The known transponder (T) 1 for inductive sending and receiving of energy signals and/or data signals has a transponder oscillating circuit (TSK) 2 which is coupled inductively to a base station (BS) 20 on one side and via a starter device (AV) 3 to a storage capacitor (SK) 13 on the other side. When energy and/or data are/is received, the storage capacitor (SK) 13 is charged with an initial charging voltage $U_{CI}$. When sending, the storage capacitor (SK) 13 is discharged. During the discharge operation, the discharge voltage $U_{Ce}$ at the storage capacitor (SK) 13 drops. At the start of sending $t_0$, the amount of the discharge voltage $U_{Ce}$ corresponds to the amount of the initial charging voltage $U_{CI}$.

When sending, the transponder oscillating circuit (TSK) 2 is supplied with energy from the storage capacitor (SK) 13 by means of the discharge operation if the send voltage $U_{S-TSK}$ of the transponder oscillating circuit (TSK) 2 is less than a send voltage desired value $U_{S-SOLL}$ of the starter device (AV) 3. The send voltage desired value of the starter device $U_{S-SOLL}$ is defined as the difference between the present discharge voltage $U_{Ce}$ and a reference voltage $U_{ref}$ which is permanently predefined by the starter device (AV) 3.

FIG. 2a shows a U/t diagram for illustrating the time-based profile of the send voltage $U_{S-TSK}$ and the discharge voltage $U_{Ce}$ during a send operation for a transponder (T) 1 as per FIG. 1. The send duration $t_s$ is defined as the period between the start of sending $t_0$ and the end of sending $t_E$.

At the start of sending $t_0$, the amount of the discharge voltage $U_{Ce}$ is identical to the amount of the initial charging voltage $U_{CI}$. The discharge voltage $U_{Ce}$ of the storage capacitor (SK) 13 decreases exponentially in its time-based profile. The curve of the send voltage desired value $U_{S-SOLL}$ is given by the difference between the curve of the discharge voltage $U_{Ce}$ and the amount of the reference voltage $U_{ref}$. If the send voltage actual value $U_{S-IST}$ falls below the send voltage desired value $U_{S-SOLL}$, the starter device (AV) 3 excites the transponder oscillating circuit (TSK) 2 by means of the discharge current $I_{Ce}$. The excitation of the send voltage $U_{S-TSK}$ of the transponder oscillating circuit (TSK) 2 by means of the discharge current $I_{Ce}$ is generally referred to as "plucking".

As a result of the exponential subsidence of the discharge voltage $U_{Ce}$, the send voltage actual value $U_{S-IST}$ will always fall below the send voltage desired value $U_{S-SOLL}$ as from the time point $t_Z$, wherein the time point $t_Z$ designates the time point from which the discharge voltage $U_{Ce}$ is less than or equal to the reference voltage $U_{ref}$. The consequence of this is a constant "plucking" between the time points $t_Z$ and the end of sending $t_E$. If the discharge voltage $U_{Ce}$ reaches the reference voltage $U_{ref}$ before the end of sending $t_E$, the amplitude of the envelopes H of the send voltage $U_{S-TSK}$ is no longer sufficient for sending with regard to the signal/noise ratio. As shown in FIG. 2a, the signal/noise ratio for the send voltage $U_{S-TSK}$ between the time points $t_Z$ and the end of sending $t_E$ will be too small.

FIG. 2b shows an I/t diagram for illustrating the discharge current $I_{Ce}$ during a send operation for a transponder (T) 1 as per FIG. 1. A current pulse of the discharge current $I_{Ce}$ is generated At the time points $t_0, t_1, t_2$, etc., thereby exciting the transponder oscillating circuit (TSK) 2 as per FIG. 1 and FIG. 2a. The distance separating the "plucking" or current pulses becomes steadily smaller between the time points $t_0$ and $t_z$, since the discharge voltage $U_{Ce}$ and therefore the send voltage desired value $U_{S-SOLL}$ of the starter device (AV) 3 decrease exponentially. The envelope H of the send voltage $U_{S-TSK}$ therefore subsides exponentially (see FIG. 2a, FIG. 2b), i.e. most of the signal energy or signal amplitude is available at the start of sending $t_0$. The signal amplitude or envelope H of the send voltage $U_{S-TSK}$ continues to subside during the send duration $t_s$, and consequently the signal/noise ratio becomes continuously smaller.

If the time point $t_Z$ comes before the end of sending $t_E$, the signal which must be sent has too little signal energy in the time window between $t_Z$ and $t_E$. Too little signal energy with regard to the existing physical send channel results in a signal/noise ratio which is too small to allow correct detection of the sent signal at the receiver.

If the time point $t_Z$ comes after the end of the signal duration $t_E$, however, all the energy which would have been available for sending is not fully utilized. Over the whole send duration $t_s$, therefore, a reduced signal energy is provided for the send voltage $U_{S-TSK}$, even though the storage capacitor (SK) could make more energy available for sending and therefore for increasing the signal/noise ratio. Consequently, optimal utilization of the energy provided if applicable by the storage capacitor is not established.

SUMMARY

On this basis, the present invention addresses the problem of providing an optimized energy supply for a transponder of the type in question. In particular, the signal/noise ratio will also be improved.

The transponder according to the invention comprises a transponder oscillating circuit, an energy store (SK) for energy supply and a starter device. The transponder oscillating circuit consists of an oscillating circuit capacitor and an oscillating circuit coil which has an inductive coupling to a base station for inductive transmission of energy and/or data. The energy store provides a discharge current $I_{Ce}$ when sending. Finally, the starter device (AV) is arranged between the transponder oscillating circuit (TSK) and the energy store (SK) in such a way that it generates an adjustable reference voltage $U_{ref}$ which regulates the send voltage $U_{S-TSK}$ when sending, such that an envelope curve H of the send voltage $U_{S-TSK}$ is constant over a send duration $t_s$, whereby a constant discharge current $I_{Ce}$ from the energy store (SK) supplies the transponder oscillating circuit (TSK) and a discharge voltage $U_{Ce}$ of the energy store (SK), which discharge voltage $U_{Ce}$ is dependent on the reference voltage $U_{ref}$, drops linearly down to the reference voltage $U_{ref}$ at an end of sending $t_E$.

The present invention is therefore based on the idea of regulating the send voltage $U_{S-TSK}$ by means of an adjustable reference voltage $U_{ref}$ such that the consumption of the energy provided by an energy store (SK) is optimized.

One advantage of the present invention is that an optimized send signal or an optimized envelope curve H of the send voltage $U_{S-TSK}$ therefore has a constant amplitude from signal start $t_0$ to signal end $t_E$. Consequently, the signal/noise ratio for signals which must be sent is constant and can be regulated. By means of the adjustable reference voltage $U_{ref}$, the energy which is consumed when sending can be adjusted such that it corresponds to the energy stored in the energy store (SK). The energy balance of the transponder (T) is therefore optimized. The energy which is stored in the energy store is delivered to the transponder oscillating circuit (TSK) in a constant manner, such that just enough energy for the send voltage $U_{S-TSK}$ is available at the end of sending.

According to a preferred development, the starter device (AV) features an adjustment device which adjusts the reference voltage $U_{ref}$ depending on an initial charging voltage $U_{Cl}$, by means of which the energy store was charged during the receipt of energy and/or data, on physical switching parameters and on the send duration of the transponder (T). Consequently, the reference voltage $U_{ref}$ can be advantageously readjusted for each send operation depending on present parameters, such that the energy consumption and the signal/noise ratio for signals that must be sent can be optimized for each send operation.

According to a preferred embodiment, the starter device (AV) includes a reference voltage generator which calculates the reference voltage $U_{ref}$ on the basis of the initial charging voltage $U_{Cl}$, the send duration $t_s$ and the physical switching parameters τ.

According to a further preferred development, the starter device (AV) includes a charge voltage sensor which measures the initial charging voltage $U_{Cl}$ and transmits the measured initial charging voltage $U_{Cl}$ to the reference voltage generator, a send duration sensor by means of which the send duration can be adjusted and which transmits the send duration to the reference voltage generator, and a switching parameter sensor in which the physical switching parameters τ of the transponder (T) are stored and which transmits the stored physical switching parameters τ to the reference voltage generator.

The reference voltage $U_{ref}$ is advantageously calculated depending if possible on all the parameters which influence the send operation.

According to a further preferred embodiment, the energy store (SK) is designed as a storage capacitor (SK).

According to a further preferred embodiment, the starter device (AV) includes a first difference device which calculates a send voltage desired value $U_{S-SOLL}$ from the discharge voltage $U_{Ce}$ of the energy store and the reference voltage $U_{ref}$.

According to a further preferred embodiment, the starter device (AV) includes a send voltage measuring device which measures the present send voltage $U_S$ of the starter device (AV) and therefore provides a send voltage actual value $U_{S-IST}$ of the starter device (AV).

According to a further preferred embodiment, the starter device (AV) includes a second difference device which calculates a desired value/actual value difference SID from the send voltage desired value $U_{S-SOLL}$ and the send voltage actual value $U_{S-IST}$.

According to a further preferred embodiment, the starter device (AV) includes a regulator and a starter circuit, wherein the regulator takes the desired value/actual value difference SID and generates a starter signal AS therefrom and supplies said starter signal AS to the starter circuit if the desired value/actual value difference SID is greater than zero, wherein the starter circuit excites the transponder oscillating circuit (TSK) by means of energy from the energy store if a starter signal AS is present.

According to a further preferred embodiment, the starter circuit includes a controlled current source which, controlled by the starter signal AS, excites the transponder oscillating circuit (TSK) by means of the discharge current $I_{Ce}$ of the energy store.

According to a further preferred development, the physical switching parameters are formed by an oscillating circuit frequency $f_{SK}$, an oscillating circuit inductivity $L_{SK}$ and/or an oscillating circuit quality $Q_{SK}$ of the transponder oscillating circuit (TSK) and by a storage capacity of the energy store (SK). The physical switching parameters advantageously comprise all parameters relating to the transponder (T), such that the calculated reference voltage $U_{ref}$ for regulating the send voltage $U_{S-TSK}$ corresponds exactly to the reference voltage $U_{ref}$ such that the energy consumption of the transponder (T) is optimized.

BRIEF DESCRIPTION OF THE DRAWINGS

The present invention is suitable in particular for the inductive sending and receiving of energy signals and/or data signals. It is explained in greater detail below with reference to exemplary embodiments and the drawing comprising schematic figures in which:

FIG. 4 shows a U/t diagram for illustrating the time-based profile of the send voltage and the discharge voltage during a send operation for a transponder as per FIG. 3.

In all figures of the drawing, identical or functionally identical elements and signals have been assigned the same reference signs unless specified otherwise.

DETAILED DESCRIPTION

Figure 1:
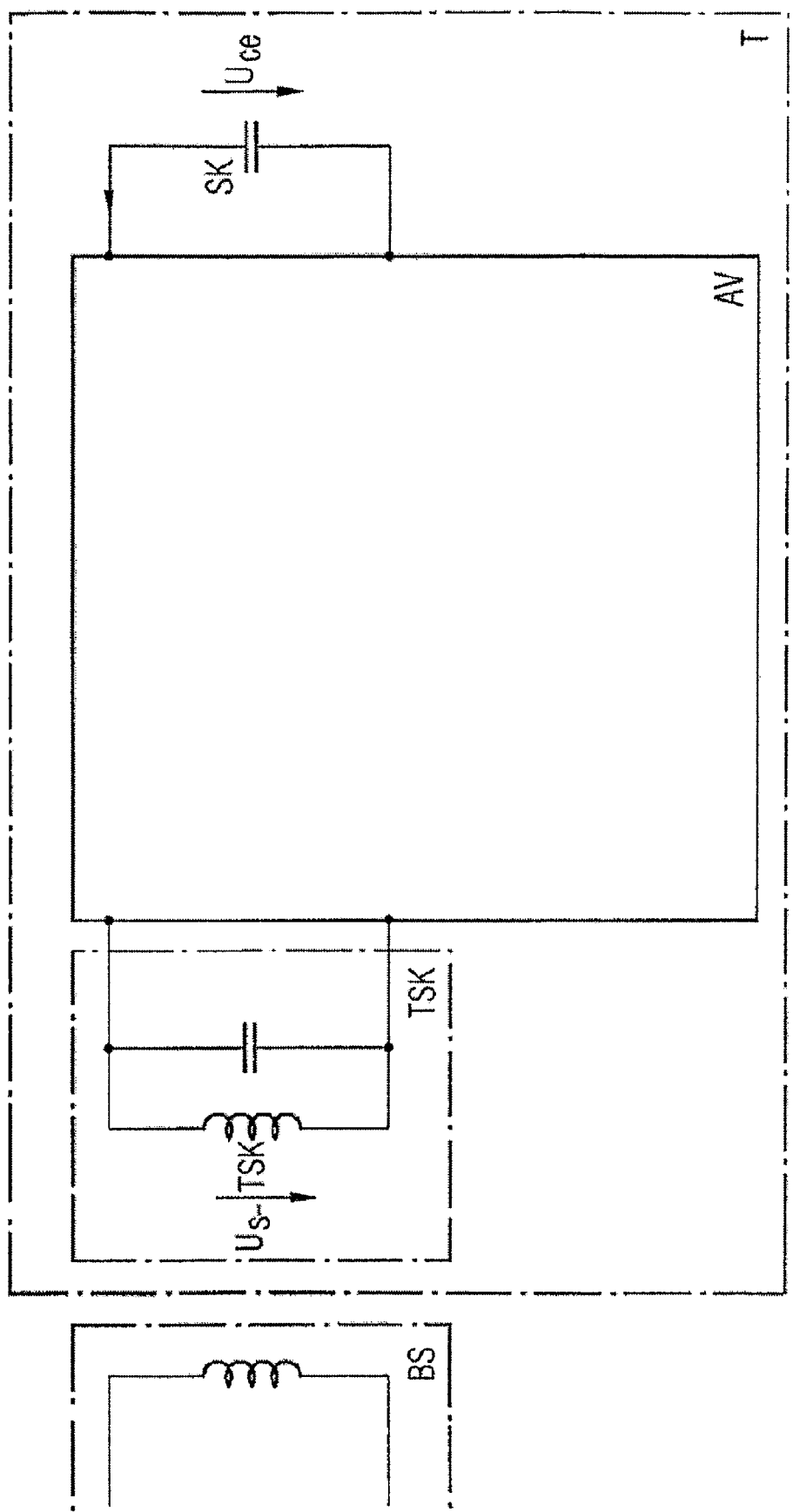
FIG. 1 shows a schematic block diagram of a generally known transponder.
Figure 2A:
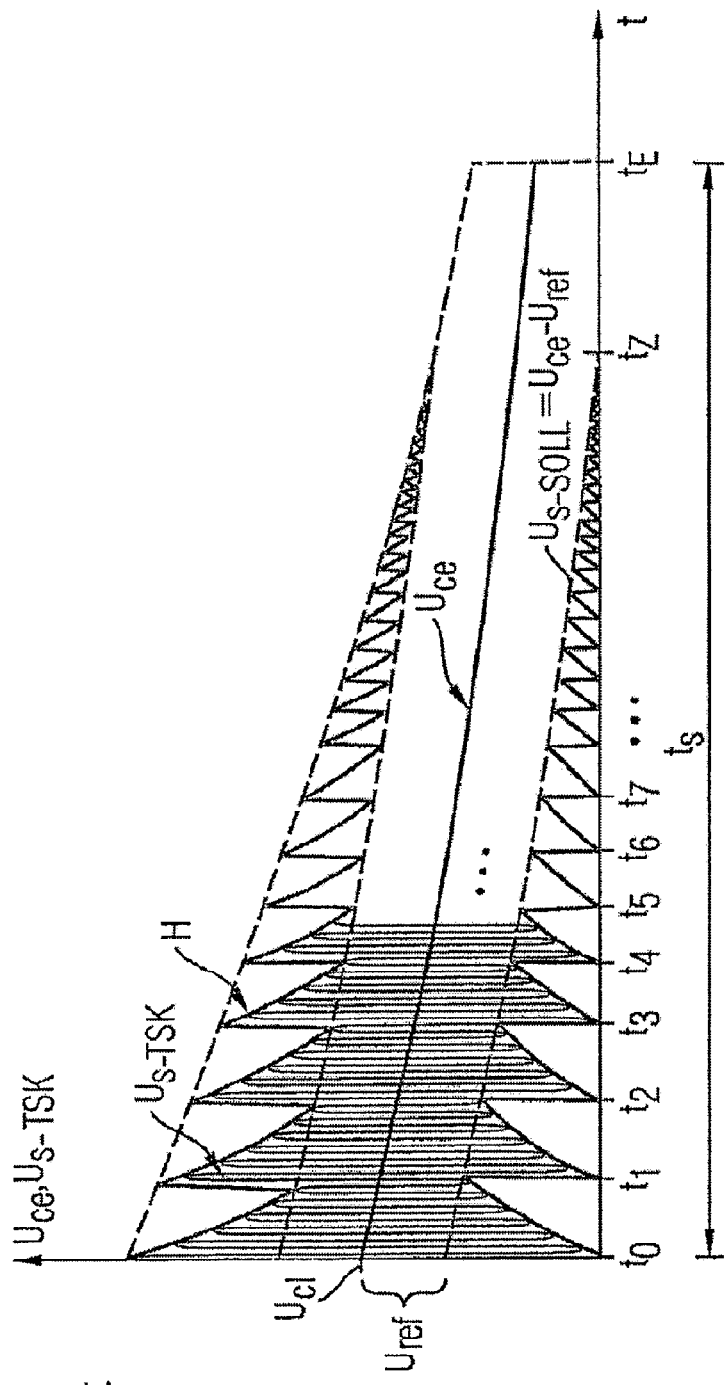
FIG. 2a shows a U/t diagram for illustrating the time-based profile of the send voltage and the discharge voltage during a send operation for a transponder as per FIG. 1.
Figure 2B:
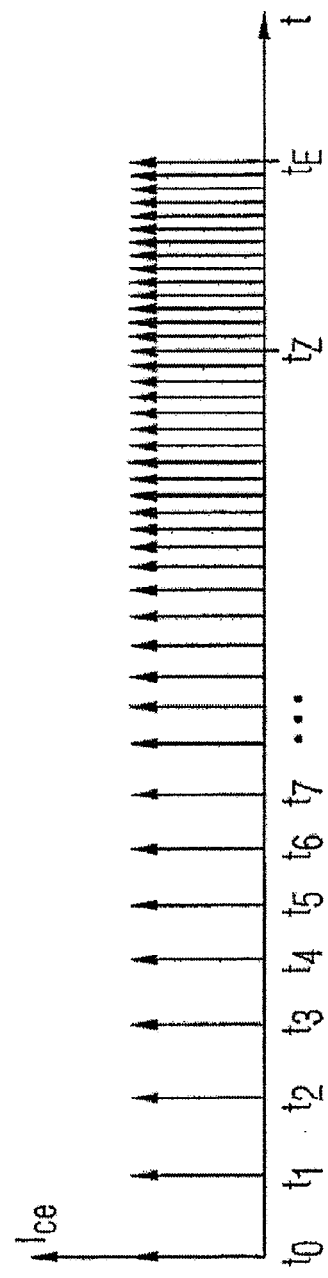
FIG. 2b shows an I/t diagram for illustrating the discharge current during a send operation for a transponder as per FIG. 1.
Figure 3:
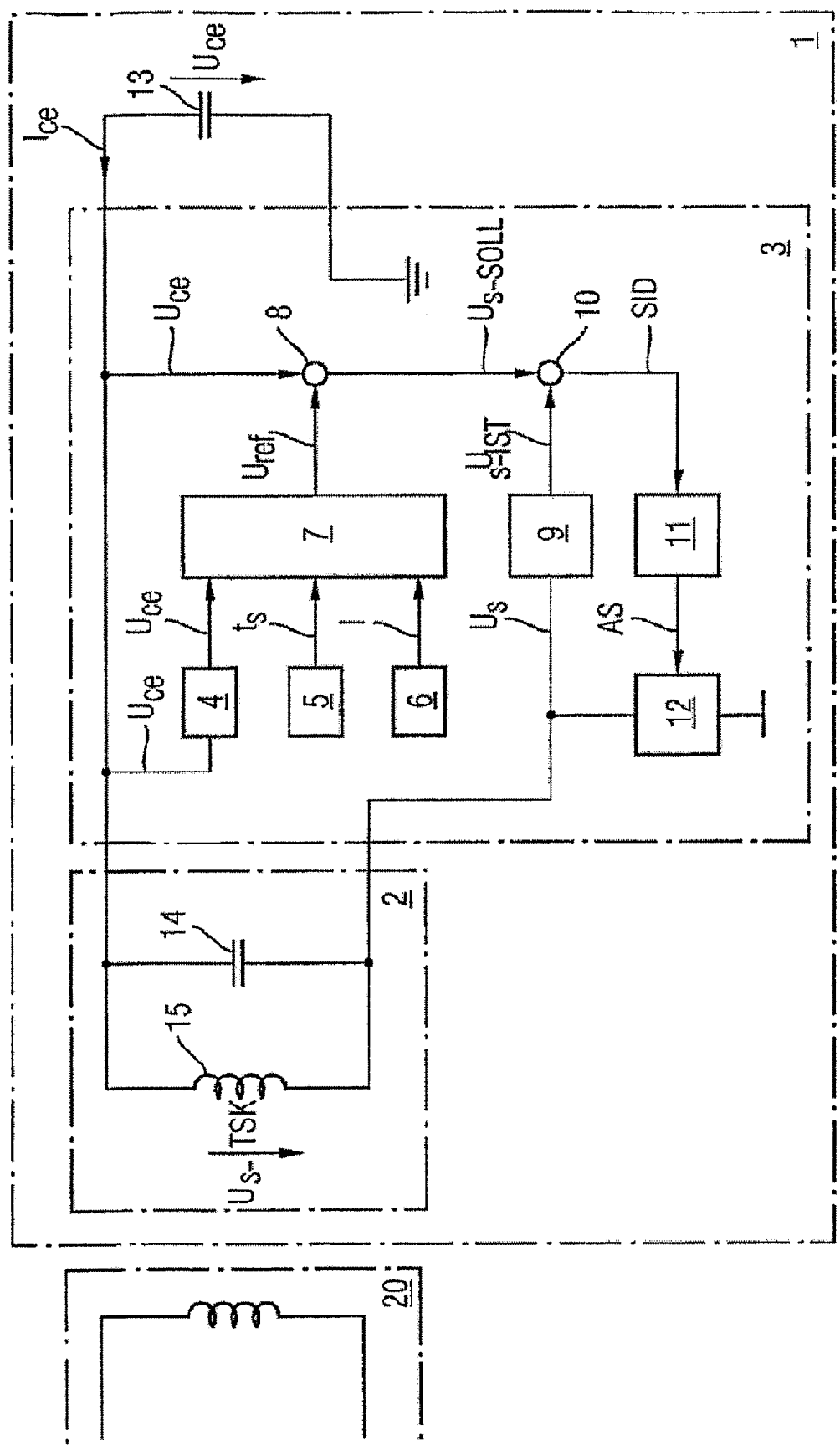
FIG. 3 shows a schematic block diagram of a transponder according to the invention.

FIG. 3 shows a schematic block diagram of a transponder (T) 1 according to the invention.

The transponder (T) 1 has a transponder oscillating circuit (TSK) 2 for inductively sending and receiving energy signals and/or data signals. For this, the transponder oscillating circuit (TSK) 2 consists of an oscillating circuit capacitor (14) and an oscillating circuit coil (15) which has an inductive coupling to a base station (20) for the purpose of inductive transmission of energy and/or data. When sending, the transponder oscillating circuit (TSK) 2 is dependent on a send voltage $U_{S-TSK}$.

In addition, the transponder (T) 1 has an energy store 13 which provides a discharge current $I_{Ce}$ when sending. The energy store 13 is preferably designed as a storage capacitor (SK).

Furthermore, the transponder 1 includes a starter device (AV) 3 which is arranged between the transponder oscillating circuit (TSK) 2 and the energy store (SK) 13. The starter device (AV) 3 generates an adjustable reference voltage $U_{ref}$ which regulates the send voltage $U_{S-TSK}$ when sending, such that an envelope curve H of the send voltage $U_{S-TSK}$ is constant over a send duration $t_s$. Therefore a constant discharge current $I_{Ce}$ of the energy supply (SK) 13 feeds the transponder oscillating circuit (TSK) 2, and a discharge voltage $U_{Ce}$ of the energy store (SK) 13, said discharge voltage $U_{Ce}$ being dependent on the reference voltage $U_{ref}$, decreases linearly down to the reference voltage $U_{ref}$ at an end of sending $t_E$.

In the starter device (AV) 3, provision is made for an adjustment device 4-7 which adjusts the reference voltage $U_{ref}$ depending on an initial charging voltage $U_{CI}$, physical switching parameters τ, and the send duration $t_s$ of the transponder (T) 1. The initial charging voltage $U_{CI}$ corresponds to the voltage with which the energy store (SK) 13 was charged while receiving energy and/or data. The physical switching parameters τ are formed by an oscillating circuit frequency $f_{SK}$, an oscillating circuit inductivity $L_{SK}$, and/or an oscillating circuit quality $Q_{SK}$, of the transponder oscillating circuit (TSK) 2, and by the storage capacity $C_S$ of the energy store (SK) 13.

The starter device (AV) 3 has a reference voltage generator 7 which calculates the reference voltage $U_{ref}$ on the basis of the initial charging voltage $U_{CI}$, the send duration $t_s$ and the physical switching parameters τ.

The starter device (AV) 3 has a charge voltage sensor 4 which measures the initial charging voltage $U_{CI}$ when energy signals and/or data signals are received and transmits the measured initial charging voltage $U_{CI}$ to the reference voltage generator 7. In addition, the starter device (AV) 3 has a send duration sensor 5 by means of which the send duration $t_s$ can be adjusted and which transmits the send duration $t_s$ to the reference voltage generator 7. In addition, the starter device (AV) 3 has a switching parameter sensor 6 in which the physical switching parameters τ of the transponder 1 are stored and which transmits the stored physical switching parameters τ to the reference voltage generator 7.

A first difference device 8 of the starter device (AV) 3 calculates a send voltage desired value $U_{S-SOLL}$ from the discharge voltage $U_{Ce}$ of the energy store (SK) 13 and the reference voltage $U_{ref}$:

$$U_{S-SOLL} = U_{Ce} - U_{ref}$$

The starter device (AV) 3 includes a send voltage measuring device 9 which measures the present send voltage $U_S$ of the starter device (AV) 3 and therefore provides a send voltage actual value $U_{S-IST}$ of the starter device (AV) 3.

A second difference device 10 of the starter device (AV) 3 calculates a desired value/actual value difference SID from the send voltage desired value $U_{S-SOLL}$ of the starter device (AV) 3 and the send voltage actual value $U_{S-IST}$ of the starter device (AV) 3:

$$SID = U_{S-SOLL} - U_{S-IST}$$

The starter device (AV) 3 also includes a regulator 11 and a starter circuit 12, wherein the regulator 11 takes the desired value/actual value difference SID and generates a starter signal AS therefrom and supplies said starter signal AS to the starter circuit 12 if the desired value/actual value difference SID is greater than zero. If a starter signal AS is present, the starter circuit 12 excites the transponder oscillating circuit (TSK) 2 by means of energy from the energy store (SK) 13, preferably using the discharge current $I_{Ce}$.

The starter circuit 12 preferably includes a controlled current source which, controlled by the starter signal AS, excites the transponder oscillating circuit (TSK) 2 by means of the discharge current $I_{Ce}$ of the energy store (SK) 13.

FIG. 4 shows a voltage/time (U/t) diagram for illustrating the time-based profile of the send voltage $U_{S-TSK}$ and the discharge voltage $U_{Ce}$ during a send operation for a transponder (T) 1 according to the invention as per FIG. 3.

The abscissa designates the time axis t, wherein the send duration $t_s$ begins at the start of sending $t_0$ and ends at the end of sending $t_E$.

At the start of sending $t_0$, the discharge voltage $U_{Ce}$ corresponds to the initial charging voltage $U_{CI}$ with which the energy store (SK) 13 was charged.

As described above, the discharge voltage $U_{Ce}$ decreases linearly starting from the initial charging voltage $U_{CI}$ and depending on the reference voltage $U_{ref}$, the time t and the physical switching parameters τ. The discharge voltage $U_{Ce}$ is derived as follows:

$$U_{Ce}(t) = U_{CI} - \frac{U_{ref}}{\tau} t$$

where the following applies for the physical switching parameters τ:

$$\tau = 4\pi * f_{SK} * L_{SK} * Q_{SK} * CS$$

The discharge voltage $U_{Ce}$ decreases linearly during the send duration $t_s$. The send voltage desired value $U_{S-SOLL}$, which is given by the difference between the discharge voltage $U_{Ce}$ and the reference voltage $U_{ref}$, decreases linearly analogously to the discharge voltage $U_{Ce}$.

According to the energy balance as per the invention, the discharge voltage $U_{Ce}$ at the end of sending $t_E$ corresponds to the reference voltage $U_{ref}[U_{Ce}(t=t_E)-U_{ref}=0]$. On the basis of this condition, the starter device (AV) 3 calculates the optimal reference voltage $U_{ref}$ and adjusts this as follows:

$$U_{ref} = \frac{U_{CI}}{1 + \frac{t_E}{\tau}}$$

The send voltage $U_{S-TSK}$ now oscillates advantageously between $U_{Ce} - U_{ref}$ and $U_{Ce} + U_{ref}$, since the send voltage $U_{S-}$ $T_{SK}$ is regulated to the adjusted reference voltage $U_{ref}$ in accordance with the invention. Therefore the envelope curve H of the send voltage $U_{S\text{-}TSK}$ remains constant over the entire send duration $t_s$.

Although the present invention is described above with reference to a preferred exemplary embodiment, it is not limited to this but can be modified in many and diverse ways.

The transponder oscillating circuit (TSK) can have further capacitances, for example, such that it is possible to switch between different oscillating circuit frequencies (frequency shift keying, FSK). In addition, the first and the second difference device can be designed as a single difference device. Furthermore, the transponder oscillating circuit (TSK) for sending and receiving energy and/or data signals can be inductively coupled to an intermediate circuit (ring antenna).

The present invention has the advantage that it features an optimized send signal, i.e. an optimized envelope curve of the send voltage features a constant amplitude from signal start until signal end. The signal/noise ratio for signals which must be sent is therefore constant and can be regulated. Using the reference voltage, the energy which is consumed when sending can be adjusted in such a way that the usable energy can be extracted uniformly over the whole protocol time from $t_0$ to $t_E$.

What is claimed is:

1. A transponder comprising:
   a transponder oscillating circuit comprising an oscillating circuit capacitor and an oscillating circuit coil which has an inductive coupling to a base station for inductive transmission of energy and/or data;
   an energy store which provides a discharge current when sending; and
   a starter device which is arranged between the transponder oscillating circuit and the energy store and which generates an adjustable reference voltage, wherein
   the starter device has a reference voltage generator which forms the reference voltage on the basis of parameters supplied on the input side from a charge voltage sensor, from a send duration sensor having adjustable send duration, and from a switching parameter sensor for storing physical switching parameters, wherein the parameter from the charge voltage sensor corresponds to the initial charging voltage of the energy store as measured during receipt of energy and/or data, wherein the starter device also has a difference device which forms a send voltage desired value from the difference between the discharge voltage of the energy store and the reference voltage, and wherein
   the send voltage which is present at the transponder oscillating circuit is regulated by means of the starter device in such a way that an envelope curve of the send voltage is constant over a send duration, wherein the constant discharge current from the energy store supplies the transponder oscillating circuit and a discharge voltage of the energy store, which discharge voltage is dependent on the reference voltage, drops linearly down to the reference voltage at an end of sending.

2. The transponder according to claim 1, wherein the starter device includes a send voltage measuring device which measures the present send voltage and thus forms a send voltage actual value, and the starter device includes a second difference device which calculates a desired value/actual value difference from the send voltage desired value and the send voltage actual value.

3. The transponder according to claim 1, wherein the starter device includes a regulator and a starter circuit, wherein the regulator takes the desired value/actual value difference and generates a starter signal therefrom and supplies said starter signal to the starter circuit if the desired value/actual value difference is greater than zero, wherein the starter circuit excites the transponder oscillating circuit by means of energy from the energy store if a starter signal is present.

4. The transponder according to claim 1, wherein the starter circuit includes a controlled current source which, controlled by the starter signal, excites the transponder oscillating circuit by means of the discharge current of the energy store.

5. The transponder according to claim 1, wherein the physical switching parameters are formed by an oscillating circuit frequency, an oscillating circuit inductivity and/or an oscillating circuit quality of the transponder oscillating circuit and by a storage capacity of the energy store.

6. The transponder according to claim 1, wherein the energy store is designed as a storage capacitor.

7. A transponder comprising:
   a transponder oscillating circuit comprising a capacitor and a coil;
   an energy store; and
   a starter device coupled between the transponder oscillating circuit and the energy store and generating an adjustable reference voltage, the starter device comprising a reference voltage generator forming the reference voltage on the basis of parameters supplied on the input side from a charge voltage sensor, a send duration sensor having adjustable send duration, and a switching parameter sensor for storing physical switching parameters, wherein the parameter from the charge voltage sensor corresponds to the initial charging voltage of the energy store as measured during receipt of energy and/or data, wherein
   the starter device also forms a send voltage desired value from the difference between the discharge voltage of the energy store and the reference voltage, and wherein
   the send voltage which is present at the transponder oscillating circuit is regulated by the starter device in such a way that an envelope curve of the send voltage is constant over a send duration, wherein the constant discharge current from the energy store supplies the transponder oscillating circuit and a discharge voltage of the energy store, which discharge voltage is dependent on the reference voltage, drops linearly down to the reference voltage at an end of sending.

8. The transponder according to claim 7, wherein the starter device includes a send voltage measuring device which measures the present send voltage and forms a send voltage actual value, and the starter device includes a second difference device which calculates a desired value/actual value difference from the send voltage desired value and the send voltage actual value.

9. The transponder according to claim 7, wherein the starter device includes a regulator and a starter circuit, wherein the regulator takes the desired value/actual value difference and generates a starter signal therefrom and supplies said starter signal to the starter circuit if the desired value/actual value difference is greater than zero, wherein the starter circuit excites the transponder oscillating circuit by energy from the energy store if a starter signal is present.

10. The transponder according to claim 7, wherein the starter circuit includes a controlled current source which, controlled by the starter signal, excites the transponder oscillating circuit by the discharge current of the energy store.

11. The transponder according to claim 7, wherein the physical switching parameters are formed by an oscillating circuit frequency, an oscillating circuit inductivity and/or an oscillating circuit quality of the transponder oscillating circuit and by a storage capacity of the energy store.

12. The transponder according to claim 7, wherein the energy store is designed as a storage capacitor.

13. A transponder comprising:
a transponder oscillating circuit comprising a capacitor and a coil;
an energy store; and
a starter device coupled between the transponder oscillating circuit and the energy store and generating an adjustable reference voltage, the starter device comprising a reference voltage generator forming the reference voltage on the basis of parameters supplied on the input side from a charge voltage sensor, a send duration sensor having adjustable send duration, and a switching parameter sensor for storing physical switching parameters, wherein the parameter from the charge voltage sensor corresponds to the initial charging voltage of the energy store as measured during receipt of energy and/or data, wherein
the starter device also forms a send voltage desired value from the difference between the discharge voltage of the energy store and the reference voltage, and wherein
the send voltage which is present at the transponder oscillating circuit is regulated by the starter device in such a way that an envelope curve of the send voltage is constant over a send duration, wherein the constant discharge current from the energy store supplies the transponder oscillating circuit and a discharge voltage of the energy store, which discharge voltage is dependent on the reference voltage, drops linearly down to the reference voltage at an end of sending, and
wherein the starter device includes a send voltage measuring device which measures the present send voltage and forms a send voltage actual value, and the starter device includes a second difference device which calculates a desired value/actual value difference from the send voltage desired value and the send voltage actual value.

14. The transponder according to claim 13, wherein the starter device includes a regulator and a starter circuit, wherein the regulator takes the desired value/actual value difference and generates a starter signal therefrom and supplies said starter signal to the starter circuit if the desired value/actual value difference is greater than zero, wherein the starter circuit excites the transponder oscillating circuit by energy from the energy store if a starter signal is present.

15. The transponder according to claim 13, wherein the starter circuit includes a controlled current source which, controlled by the starter signal, excites the transponder oscillating circuit by the discharge current of the energy store.

16. The transponder according to claim 13, wherein the physical switching parameters are formed by an oscillating circuit frequency, an oscillating circuit inductivity and/or an oscillating circuit quality of the transponder oscillating circuit and by a storage capacity of the energy store.

17. The transponder according to claim 13, wherein the energy store is designed as a storage capacitor.

* * * * *